US005548595A

United States Patent [19]

Hirayasu

[11] Patent Number: 5,548,595

[45] Date of Patent: Aug. 20, 1996

[54] SIGNAL RECEIVER

[75] Inventor: Masatoshi Hirayasu, Kanagawa, Japan

[73] Assignee: Sony Corporation, Tokyo, Japan

[21] Appl. No.: 201,400

[22] Filed: Feb. 24, 1994

[30] Foreign Application Priority Data

Feb. 27, 1993 [JP] Japan .................................... 5-063370

[51] Int. Cl.[6] ...................................................... G06F 11/00

[52] U.S. Cl. ............................................. 371/5.5; 371/5.1

[58] Field of Search ................................ 371/5.5, 5.1, 48, 371/47.1, 25.1, 20.1; 370/13, 14, 15, 16, 17, 53

[56] References Cited

U.S. PATENT DOCUMENTS

| | | | |
|---|---|---|---|
| 3,739,278 | 6/1973 | Gautney et al. . | |
| 4,266,292 | 5/1981 | Regan et al. | 370/13 |
| 4,374,435 | 2/1983 | Lach et al. . | |
| 4,792,953 | 12/1988 | Pasdera et al. | 371/31 |
| 5,319,455 | 6/1994 | Hoarty et al. | 348/7 |

FOREIGN PATENT DOCUMENTS

| | | |
|---|---|---|
| 141431 | 11/1984 | European Pat. Off. . |
| 264986 | 9/1987 | European Pat. Off. . |
| 2255697 | 3/1992 | United Kingdom . |

*Primary Examiner*—Hoa T. Nguyen
*Assistant Examiner*—Phung M. Chung
*Attorney, Agent, or Firm*—Jay H. Maioli

[57] ABSTRACT

A signal receiver that can function in any of three modes, such as normal mode, channel selecting mode, and mandatory announcement mode, is controlled by a microprocessor to mute the output signals or to release a muting operation depending upon the current mode. The signals being received contain an error detection/correction code and upon error decoding the number of error flags within predefined periods are checked to determine whether muting is required. The respective lengths of the predefined error flag checking periods are controlled in response to the current operating mode of the signal receiver.

19 Claims, 11 Drawing Sheets

SIGNAL RECEIVER

BACKGROUND OF THE INVENTION

1. Field of the Invention

This invention relates generally to signal receiving apparatus and, more particularly, to a signal receiving apparatus for receiving signals including error detection codes and that includes a muting mode.

2. Description of the Prior Art

In data transmission there are some cases in which a coded signal containing errors is received by a receiving apparatus, with transmission of the signals having been affected by noise or some other instantaneous disturbance. Though such code errors should preferably be small, the errors cannot be reduced to zero. Thus, in case an error is generated during transmission, the error code thereof is detected and error correction is carried out by a certain method so as to improve transmission quality. On the other hand, if the errors can not be corrected the demodulated signals are not output based on the detected error code.

For example, when RF-modulated pulse code modulation (PCM) digital signals are transmitted from a transmitter side and are demodulated at a receiver side, the error code of the demodulated signals is read and used to mute the demodulated signals if the errors can not be corrected.

In an audio sound system of an aircraft where each group of seats includes a signal receiving apparatus, for example, demodulated signals are muted in accordance with an error code thereof, so that the passengers will not hear audio signals of deteriorated quality.

In such case, the error code judging time, that is, the sampling time, is fixed to the sampling time of the normal operating mode of the audio signal playback apparatus forming part of the aircraft sound system.

Nevertheless, in addition to the normal operating mode in which the passengers enjoy listening to music, there are other operating modes for the aircraft audio sound system, such as, a channel selection mode in which the passengers themselves tune to change the band being listened to, and a Passenger Address (PA) selection mode in which the same announcement is mandatorily made to all the receiving sets of the aircraft sound system.

In this PA selection mode for announcing a message from the cockpit, the voices are outputted through so-called PA speakers throughout the aircraft, while the channel selection status of audio signals for each seat is controlled to switch to a predetermined PA channel, so as to assure delivery of the message to all of the passengers, including those using headphones.

Meanwhile, if the sampling time for the error code is fixed for muting the demodulated signals in accordance with the error code thereof, it is extremely difficult to sufficiently follow detection of the error code in the vicinity of a threshold for determining the error. More specifically, in case there are plural operating modes of the audio signal receiving apparatus, such as the channel selection mode and the PA selection mode, as well as the normal operating mode described above, restricting the sampling of the error codes only to the sampling time of the normal operating mode causes the muting time to be inappropriate for these other operating modes.

As a result of such fixed error code sampling time, in the PA selection mode the mute release is carried out after the voices of the announcement have started, and the message cannot be delivered in full to the listeners. This is the same as the absence of correct digital data. On the other hand, in the normal operating mode, the sampling of the error code in an inappropriately short sampling time causes the timing of the mute release to be too early, thus outputting erroneous digital data.

OBJECTS AND SUMMARY OF THE INVENTION

In view of the above-described situation, it is an object of the present invention to provide a signal receiving apparatus by which appropriate muting or mute release is carried out in accordance with the operating mode, so as to output only correct data of the PCM digital data at a timing appropriate for the particular operating mode.

According to an aspect of the present invention, there is provided a signal receiving apparatus appropriate for aircraft passengers for receiving audio signals including an error detection code and for muting output signals in accordance with error detection information produced from the error detection code, wherein the apparatus determines whether to mute or release muting of the output signals at predetermined cycles in accordance with the error code produced from the error detection code, and the apparatus variably controls the determining cycle in accordance with the particular operating mode.

It is preferable to set the longest determining cycle if the operating mode is a normal operating mode, then to set a shorter determining cycle if the operating mode is the mode for switching frequency bands of frequency-multiplexed input signals, and to set the shortest determining cycle if the operating mode is the mode in which an input status is mandatorily and externally controlled, such as an announcement made.

According to the signal receiving apparatus of the present invention, it is possible to variably control the determining cycle of the error detection information in accordance with the current operating mode, that is, one of the normal operating mode, the mode for switching frequency bands of frequency-multiplexed input signals, and the mode in which the input status is mandatorily and externally controlled. Therefore, it is possible to carry out appropriate muting or mute release in accordance with the operating mode, so as to output only correct PCM digital data at a timing appropriate for the operating mode.

DESCRIPTION OF PREFERRED EMBODIMENTS

In a first embodiment, the signal receiving apparatus carries out detection and correction of errors, such as, bit reversing errors in RF signals caused by the effects of noise at the time the RF output signals are transmitted from a signal transmitting apparatus or at the time when the RF output signals are received. The audio signal receiving apparatus then variably controls, in accordance with the operating mode, the cycle for determining whether to mute or release muting of the output signals in accordance with the error detection information produced from the error detection code.

In this embodiment, three operating modes are considered, namely, the normal operating mode, the mode for switching frequency bands of frequency-multiplexed input signals, and the mode in which the input status is mandatorily and externally controlled, such as the PA mode.

The normal operating mode is mode for providing RF signals received and reproduced by the audio signal receiving apparatus, in accordance with the tuning by the listener. The mode for switching frequency bands of frequency-multiplexed input signals is the channel selection mode for tuning the frequency bands. The mode in which the input status is mandatorily and externally controlled is the PA selection mode for mandatorily controlling the channel selection status of audio signals to a switch to predetermined PA channel for an announcement.

Figure 1:
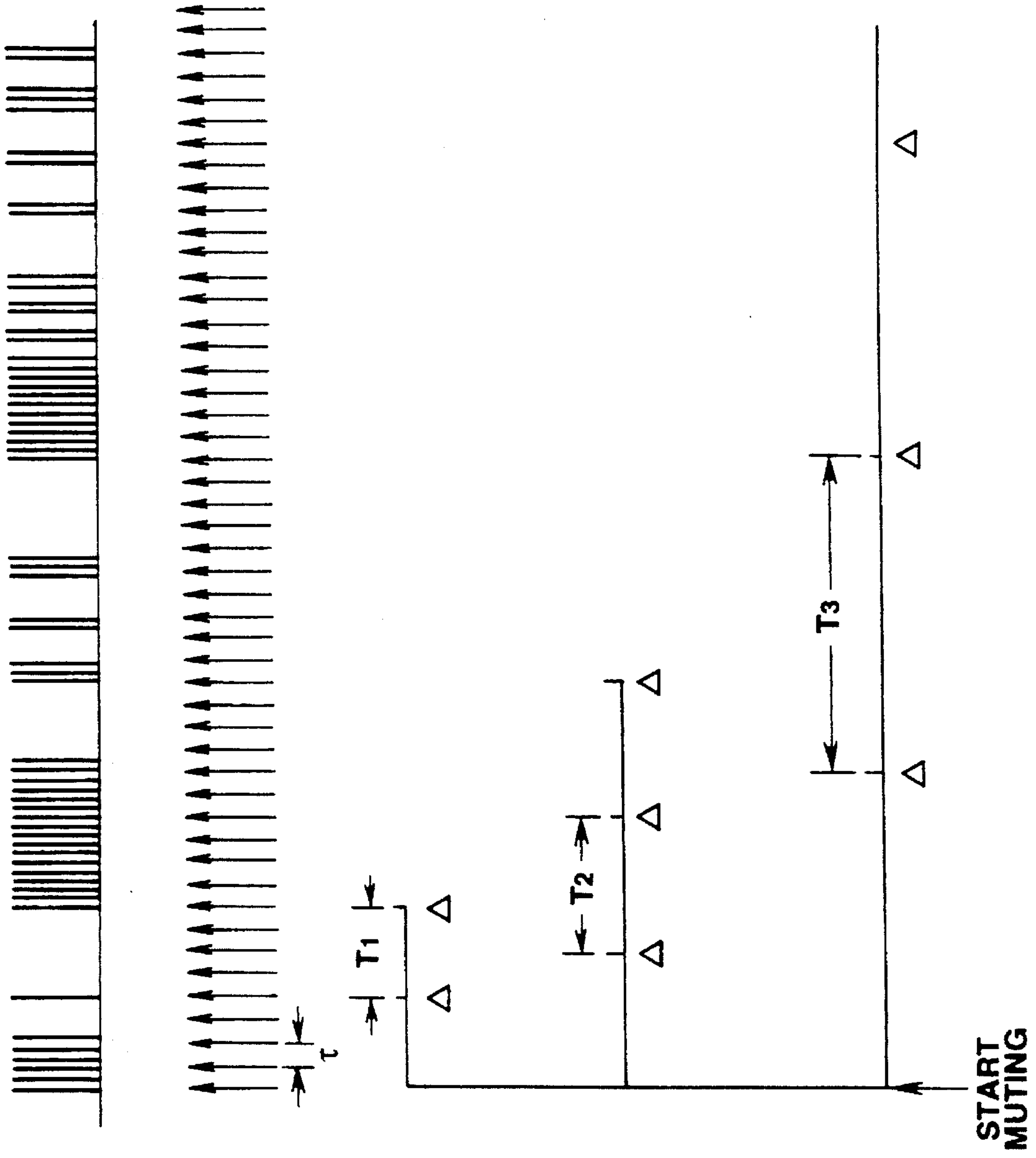
FIG. 1(*a–e*) are a timing chart for illustrating the operating principle of the first embodiment.

FIG. 1(*a*) shows a generated status of error flags produced from the error detection codes. FIG. 1(*b*) schematically shows clock timing for sampling the error flags. FIG. 1(*c*) shows mute release determining points (indicated by Δ) in the PA selection mode. FIG. 1(*d*) shows mute release determining points (indicated by Δ) in the channel selection mode. FIG. 1(*e*) shows mute release determining points A in the normal operating mode. The mute release determining points are the points at which it is determined whether to mute output signals, as well as whether to release muting.

Intervals between A and A shown in FIGS. 1(*c*), 1(*d*) and 1(*e*) respectively, represent cycles for determining whether to mute output signals or whether to release the muting thereof.

In the PA selection mode, the error flags shown in FIG. 1(*a*) are sampled by clocks of a cycle τ shown in FIG. 1(*b*), and the number of sampled error flags is counted over a determining cycle T1 shown in FIG. 1(*c*). Thus, determination is made as to whether to mute or release muting on the basis of the number of error flags within the determining cycle.

In the channel selection mode, the error flags of FIG. 1(*a*) are sampled by the clocks of the cycle τ shown in FIG. 1(*b*), and the number of error flags sampled is counted over a determining cycle T2 shown in FIG. 1(*d*). Thus, determination is made on whether to mute or release muting on the basis the number of error flags within the somewhat longer determining cycle.

In the normal operating mode, the error flags of FIG. 1(*a*) are sampled by the clocks of the cycle τ shown in FIG. 1(*b*), and the number of sampled error flags is counted at the longest determining cycle T3 shown in FIG. 1(*e*). Thus, determination is made on whether to mute or release muting on the basis the number of error flags within the determining cycle.

The determining cycles T1, T2, T3 are determined from the numbers of clocks (T1/τ), (T2/τ), (T3/τ), respectively. As noted above and seen from FIGS. 1, the relative lengths of the determining cycles T1, T2, T3 are such that T1<T2<T3.

In the normal operating mode, the listeners are typically listening to music or the like, as described above, and accuracy rather than speed is required for the determination as to whether to mute or release muting. Therefore, the determining cycle T3 may be the longest.

In the channel selection mode, tuning is carried out for selecting frequency bands, as described above. At the time of tuning, emphasis is laid on the time period until the mute caused by errors due to noise is released. That is, since speed rather than accuracy is required and there is no need to seek the accuracy of the normal operating mode, the determining cycle T2 may be shorter.

In the PA selection mode, the music to which the listeners are listening is mandatorily switched to some important information, such as a pilot's announcement. In the PA selection mode, the greatest emphasis is laid on the time until the mute condition caused by errors due to noise is released. For example, if accurate mute release is intended to be carried out to cause voices of the announcement to interrupt the music mandatorily, there are some cases in which the starting voices of the announcement are not heard. Thus, the listeners cannot understand the complete content of the announcement and may be confused. Therefore, the determining cycle T1 is the shortest.

The muting or mute release is carried out, by judging whether the numbers of error flags sampled during the determining cycles T1, T2, T3, respectively, are above a predetermined threshold. That is, the muting is continued if the number of error flags is greater than the threshold, while the mute is released if the number is smaller than the threshold.

Figure 2:
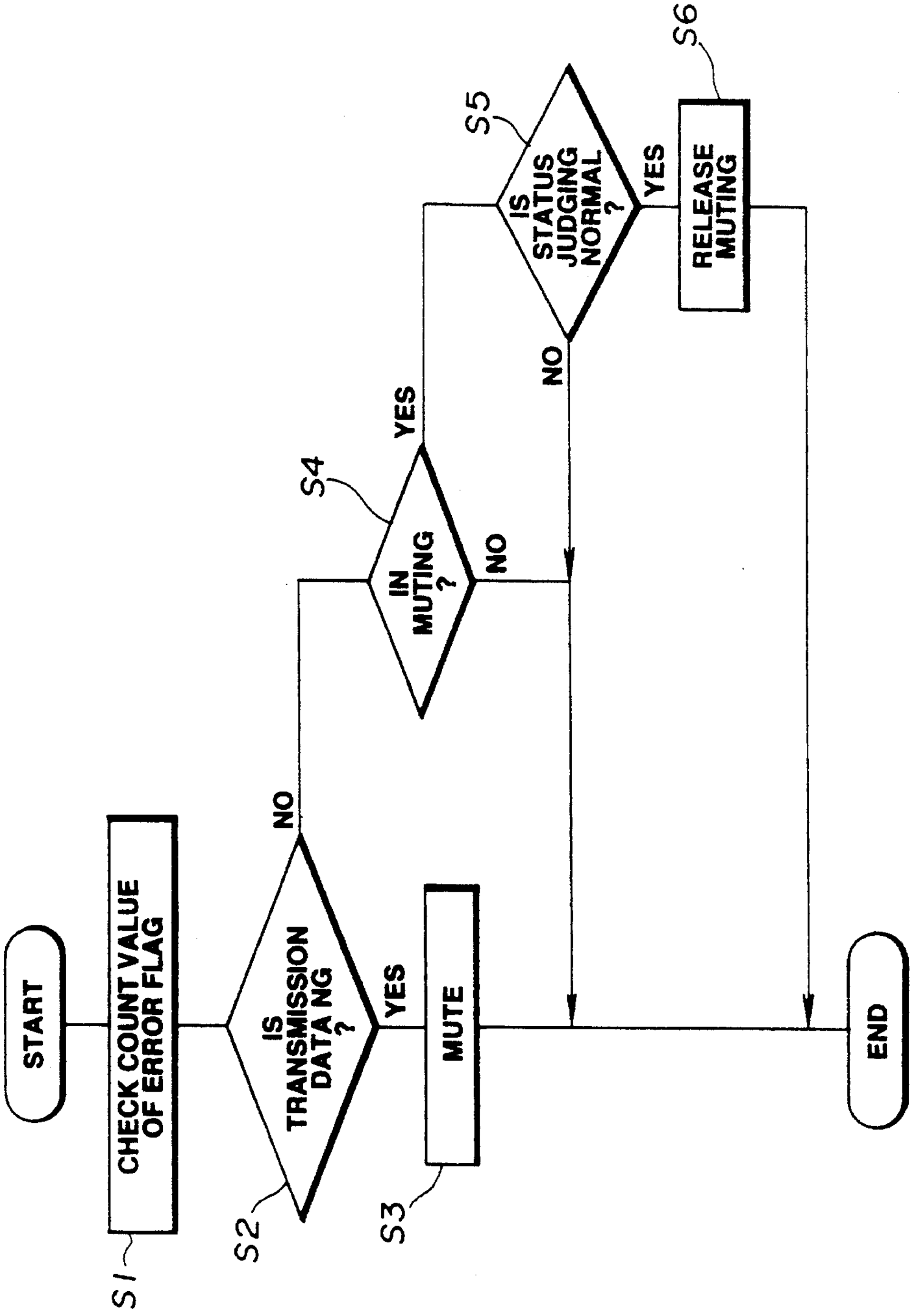
FIG. 2 is a flowchart for illustrating the operation of the first embodiment.

Essential portions of the operational principle of the audio signal receiving apparatus of the first embodiment shown in FIGS. 1(*a*)–1(*e*) will now be described with reference to the flowchart of FIG. 2. More specifically, the count value of the error flags is checked at step S1. At step S2 it is judged whether transmission data are good or not on the basis of the count value, which is the number of error flags. The method proceeds to step S3 if the judgment is YES, while the method proceeds to step S4 if the judgment is NO.

At step S3 output signals are muted on the basis of the judgment at step S2 that the transmission data are no good. Thus, the procedure ends at this stage.

At step S4, it is judged whether the muting is already being conducted. The method ends if the judgement is NO, indicating that the muting is not being conducted, while the method proceeds to step S5 if the judgment is YES.

At step S5, it is judged whether the status of each operating mode is normal. The mute is released if the judgment is YES, while the procedure ends if the judgment is NO.

The above-described judgment is made, in general, by a controller or a micro processor on the basis of the error flags produced from the error detection codes.

Figure 3:
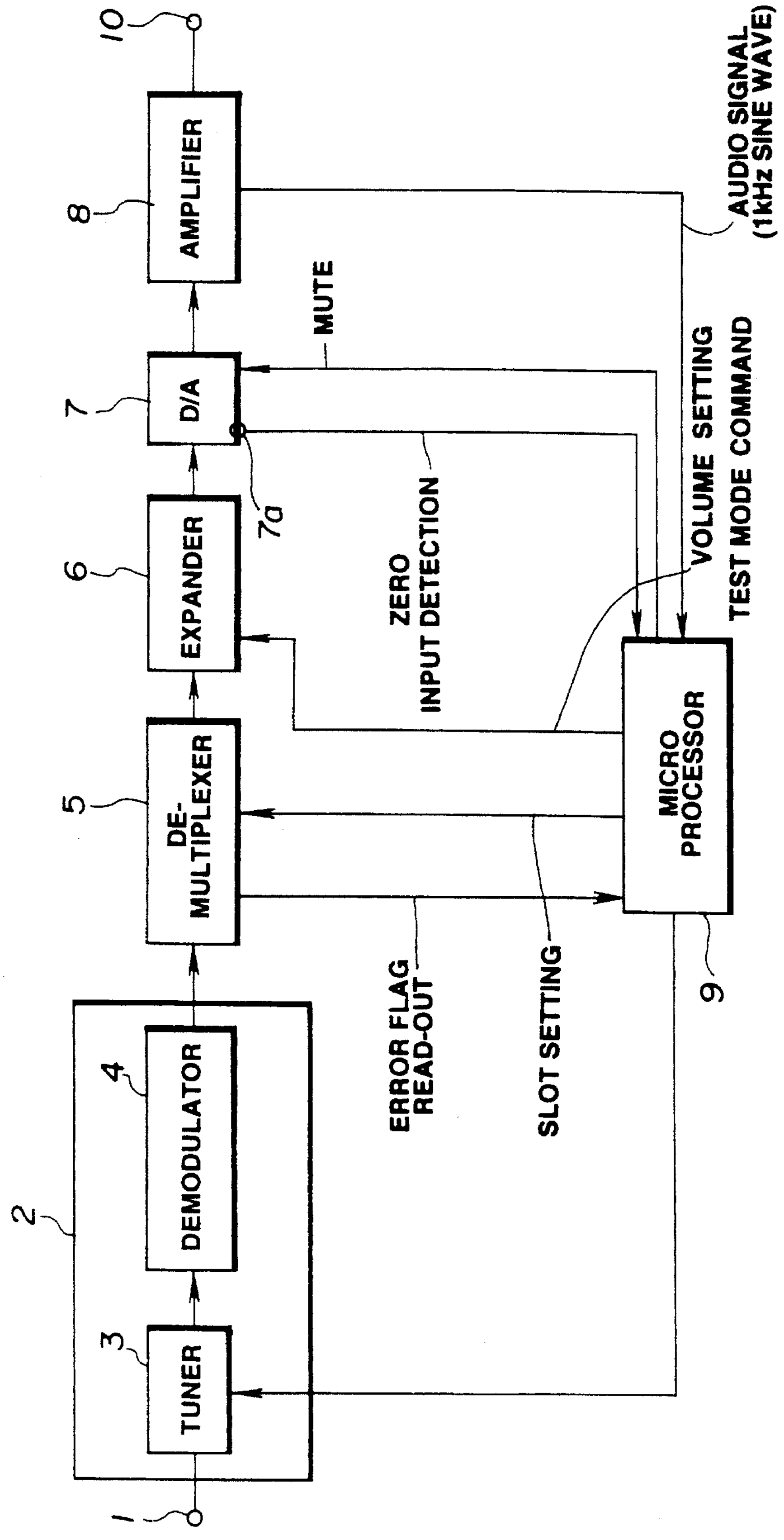
FIG. 3 is a schematic block diagram showing an arrangement of the first embodiment.

FIG. 3 is a schematic block diagram showing an arrangement of the audio signal receiving apparatus of a first embodiment in which RF signals transmitted from an audio signal transmitter are entered to the audio signal receiving apparatus at an input terminal 1 thereof.

The RF signals at the input terminal 1 are fed to a tuner 3 of an RF receiving/demodulating circuit 2. The tuner 3 selects and converts the RF signal of one band of the frequency-multiplexed RF signals into an IF intermediate frequency (IF) signal and transmits the IF signal to a demodulator circuit 4. The demodulator circuit 4 demodulates the IF signal so as to output serial data having a data rate of, for example, 6.144 MHz, and transmits the serial data to a demultiplexer 5.

The serial data supplied to the demultiplexer 5 are time-division multiplexed data, and the demultiplexer 5 releases the time-division multiplex and takes out data corresponding to one frame, for example. The demultiplexer 5 carries out error correction decoding, such as BCH decoding, on each frame and then takes out a desired audio channel or data channel. The error correction is carried out for detecting and correcting bit reversal errors in digital data that may be generated by the adverse effects of noise at the time of transmitting and receiving the RF signal. The selection of an arbitrary audio channel or data channel by the demultiplexer 5 is made in response to a command from a micro processor 9. The arbitrary audio channel or data channel selected by the demultiplexer 5 is supplied to an expanding circuit 6. In the expanding circuit 6, a first expanding mode and a second expanding mode can be selected, and the mode switching and volume setting are carried out in response to a command from the micro processor 9. The audio channel or data channel expanded by the expanding circuit 6 is supplied to a D/A converter 7. The D/A converter 7 converts the audio channel expanded by the expanding circuit 6 into an analog audio signal of, for example, two channels, and transmits the analog audio signal to an amplifier 8. The analog audio signal amplified by the amplifier 8 is supplied to headphones via an output terminal 10.

The demultiplexer 5, as described above, releases time-division multiplex so as to take out data corresponding to one frame and carries out error correction decoding on each frame. In this error correction, the error flags produced from the error correction codes are supplied to the micro processor 9. The micro processor 9 constantly samples the error flags from the demultiplexer 5. Then, the microprocessor 9 variably controls the cycle for determining whether to mute or release muting of the output signals in accordance with the operating mode, as described above. That is, the microprocessor 9 judges the operating mode of the apparatus and variably controls the determining cycle of the muting or the mute release in accordance with the operating mode.

Meanwhile, the micro processor 9 carries out functional diagnosis for each of a central processing unit (CPU), a random access memory (RAM), a read-only memory (ROM) and a so-called watchdog timer, none of which are shown in FIG. 3. The micro processor 9 reads out results, such as error detection outputs or the like, of troubles or failure in tuning by the tuner, demodulation by the demodulating circuit 4, and error correction by the demultiplexer 5, and stores the results in an internal memory. This processing can be checked by calculating the BCH error correction codes that were initially added to the transmission signals by using the demultiplexer 5 and by reading out the error flags. A control to a muted status or a control for not releasing a currently muted status may be carried out while the results are stored in the memory.

In a test mode ordered by the microprocessor 9, test data in the form of 1 kHz sine waves are outputted from the expanding circuit 6, and are transmitted through the D/A converter 7 and the amplifier 8 back to the micro processor 9. The micro processor 9 detects the 1 kHz sine wave by an A/D converting circuit provided therein, and confirms normal operation of each element in the loop. Further, a 0-level signal is outputted from the expanding circuit 6, and an output from a so-called 0-input detection terminal 7*a* of the D/A converter 7 is monitored by the micro processor 9. Thus, the normal operation of the D/A converter 7 is confirmed.

Figure 4:
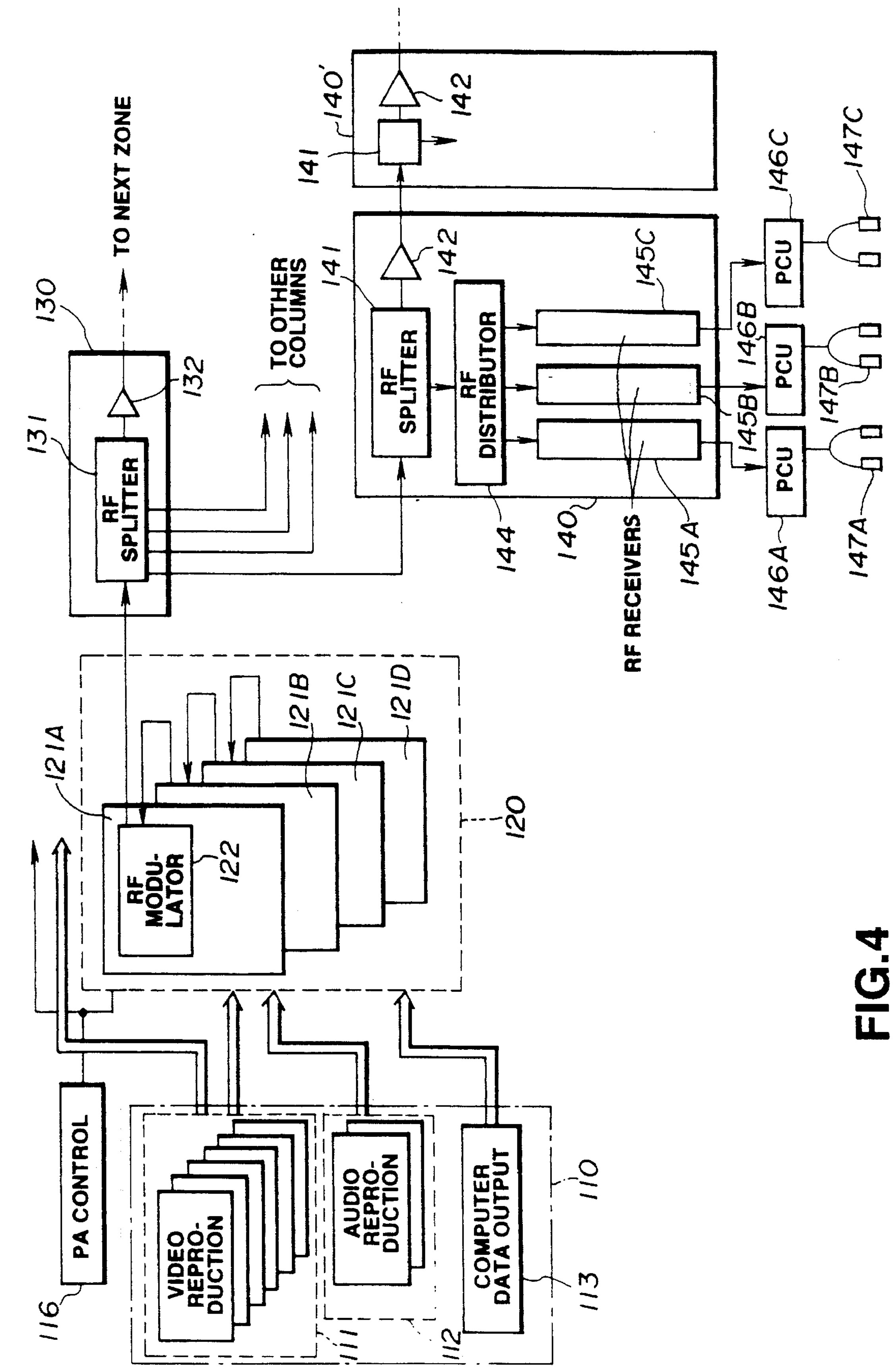
FIG. 4 is a schematic block diagram showing an arrangement of a signal transmitting system in an aircraft.

A second embodiment will now be described in which the signal receiving apparatus of the present invention is applied to an audio signal receiving apparatus of an aircraft, that is, a passenger seat unit for receiving audio signals. In FIG. 4, a transmitting signal source 110 has therein video signal reproducing equipment 111, such as a video tape recorder or a video disc player, audio signal reproducing equipment 112, such as a compact disc player and a tape recorder, and a computer data output device 113, such as video game software. There is also provided a PA controlling device 116 having a cabin announcement function using a microphone, not shown.

Among output signals from this equipment, audio or voice signals supplied from the video signal reproducing equipment 111 and the audio signal reproducing equipment 112, and computer data supplied from the computer data output device 113, are fed to an audio signal transmitting system 120. Video signals supplied from the video signal reproducing equipment 111 are transmitted to a corresponding video signal transmitting system, not shown. Voice signals supplied from the PA controlling device 116 are directly transmitted as analog voice signals to speakers, not shown, provided on aircraft cabin walls and ceilings, and at the same time, these voice signals are also transmitted to the audio signal transmitting system 120.

The audio signal transmitting system 120 includes up to four audio signal transmitting units 121A, 121B, 121C, 121D, one of which multiplexes 32-channel audio signals and 8-channel data signals, or 36-channel audio signals, and modulates the signals into RF signals using an RF modulator 122 to output modulated RF signals. The RF modulator 122 is provided with an RF mixing circuit that mixes the RF signals input from the other audio signal transmitting units. Specifically, the RF modulator 122 frequency-multiplexes RF signals of carrier frequencies that varies for each audio signal transmitting unit 121A through 121D, and outputs the frequency-multiplexed RF signals. In this case, the video signals of several channels supplied from the video signal reproducing equipment 111 may be modulated at the varying carrier frequency by an RF modulator, not shown, and be frequency-multiplexed along with the RF modulated signals of the audio signals, so as to be transmitted over one coaxial cable.

The frequency-multiplexed RF signals are transmitted to an RF splitter 131 of a zone administrating unit 130 provided for each of the zones into which the cabin is divided, and are transmitted to the next zone via the RF splitter 131 and then via an RF amplifier 132. The RF signals fed to the RF splitter 131 are split for each column as a dividing region for dividing the zone. A number of seat units 140 are connected in series within each column, and the RF signals fed to one of the seat units 140 are fed on to the next seat unit 140 via an RF splitter 141 and an RF amplifier 142.

One seat unit 140 is provided therein with circuits for three seats, that is, for three passengers. The RF signal split by the RF splitter 141 is distributed into three RF signals by an RF distributor 144, and transmitted to three RF receivers 145A, 145B, 145C. In the RF receiver 145, RF signals of one band of the frequency-multiplexed signals are taken out and RF-demodulated, and signals of a desired channel are taken out from the demodulated signals so as to be output. The signals from the RF receivers 145A through 145C are transmitted to passenger control units 146A through 146C, respectively. The passenger at each seat can connect the respective control units 146A through 146C with headphones 147A through 147C, so as to arbitrarily select audio signals of a desired channel for listening.

Figure 5:
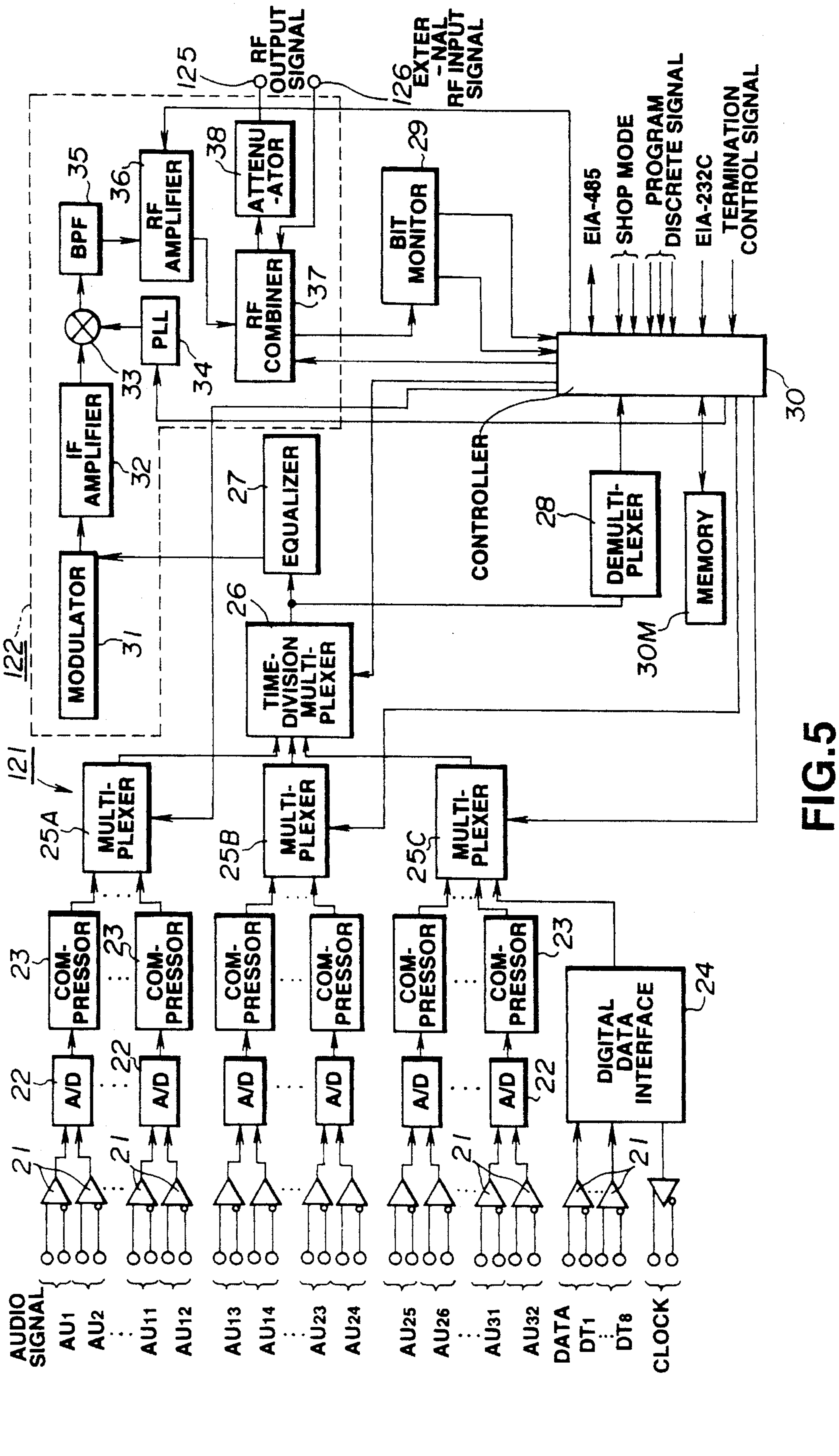
FIG. 5 is a schematic block diagram showing an arrangement of a signal transmitter side of the signal transmitting system shown in FIG. 4.

FIG. 5 is a schematic block diagram showing an arrangement of one typical unit 121 of the audio signal transmitting units 121A–121D of FIG. 4. The audio signal transmitting unit 121 receives audio signals of 32 channels and data signals of 8 channels and converts the input signals into signals having a frequency band of 6 MHz for output. The audio signal transmitting unit 121 is called an audio multiplexer unit or AMUX, on the basis of its function to multiplex audio signals and output them.

To the audio signal transmitting unit 121, audio signals AU1 through AU32 of 32 channels are supplied in the form of balanced inputs and are converted into unbalanced signals by buffer amplifiers 21. The audio signals of 32 channels supplied from the buffer amplifiers 21 are grouped into two channels each for stereo left and right channels and are transmitted to A/D converters 22, so as to be converted into digital signals. The digital signals are then transmitted to signal compressing circuits 23 so as to be compression encoded. The signal compressing circuits 23 carry out high efficiency compression encoding to adaptively control bit allocation for each band divided along the frequency axis utilizing characteristics of the human auditory sense, or so-called adaptive differential PCM encoding (ADPCM).

Computer data DT1 through DT8 of 8 channels for a video game software or the like are input in a balanced form in accordance with a so-called EIA-422 interface format, and are converted into unbalanced signals by the buffer amplifiers 21 and fed to a digital data interface circuit 24.

As the signal compressing circuit 23, it is preferable to use a circuit that is capable of switching/selecting a first compression mode for carrying out high efficiency encoding of satisfactory reproduction sound quality, although taking a long processing time utilizing the characteristics of human auditory sense, or a second compression mode of a relatively short processing time such as ADPCM, so as to switch the mode to the first compression mode in case audio signals such as music are transmitted to each seat, and so as to switch the mode to the second compression mode in case the channels are mandatorily switched to the PA channel for announcing a message from the cockpit. The first compression mode is preferable for enjoying music requiring high sound quality, while the second compression mode is preferable for the announcement in which there is little time difference between sounds through speakers provided on the cabin walls and ceilings and sounds through the headphones. The switching/selecting of the compression mode is carried out by control signals, not shown, from a controller 30. The first compression mode is exemplified by a so-called Adaptive Transform Acoustic Coding (ATRAC) mode employed for signal compression in the so-called MD or mini disc, and by a so-called Precision Adaptive Sub-band Coding (PASC) mode employed for signal compression of a so-called digital compact cassette (DCC).

The output signals for the 32 audio channels supplied from the signal compression circuits 23 are grouped into 12 channels each as 6 pairs of channels in an order from the channel corresponding to AU1 of the original input audio signals, and are fed to multiplexers 25A and 25B, respectively. The residual outputs for 8 channels (4 pairs) corresponding to the AU25 through AU32 and output signals from the digital data interface circuit 24 corresponding to data DT1 through DT8 for the 8 channels are grouped to be fed to a multiplexer 25C. From the digital data interface circuit 24, clock signals are taken out via a buffer amplifier.

Each of the multiplexers 25A through 25C processes signals according to the voice signal format of TV broadcasting signals of satellite broadcasting or satellite communications. One transmission frame of the format according to the voice signal format is constituted by 32 bits and 64 rows. This one transmission frame at least includes therein 12 channels of data each having 128 bits, for example, 12 audio channels or 8 audio channels plus 8 computer data channels, a so-called BCH error correction code, for example, a 63, 50 BCH code, and a preamble such as frame synchronization or a control code. Data are outputted from each multiplexer, for example, at a rate of 2.048 Mbps, and the output data from the multiplexers 25A through 25C are transmitted to a time-division multiplexer 26 so as to be time-division multiplexed. Thus, the data are output at a rate of 6.144 Mbps. The digital signals output from the time-division multiplexer 26 are waveform-equalized by an equalizer 27 and are compressed into a 6 kHz band prior to being fed to the RF modulator 122.

In the RF modulator 122 the signals supplied by the equalizer 27 are modulated by an intermediate frequency modulator 31 so as to be predetermined intermediate frequency (IF) signals that are amplified by an IF amplifier and transmitted to a multiplier or modulator) 33. Carrier frequency signals of a predetermined RF frequency from a Phase Locked Loop (PLL) circuit 34 are supplied to the multiplier 33. The frequency of output signals of the PLL circuit 34 is controlled by the controller 30 using a CPU and the like, not shown. Output signals from the multiplier 33 are transmitted via a bandpass filter (BPF) 35 and then via an RF amplifier 36 to an RF signal combiner 37. RF signals from another audio signal transmitting unit are supplied via an external RF input terminal 126 to the RF combiner 37. By causing the RF carrier frequency of the RF modulator 122 to differ from the carrier frequency of the external RF input signals, it is possible to carry out frequency multiplexing using the RF signal combiner 37. The output signals from the RF signal combiner 37 are taken out from an output terminal 125 via an attenuator 38.

More specifically, the RF frequency at the RF modulator 122 is such that, on the basis of three program discrete signals supplied to the controller 30, the frequency of signals outputted from the PLL circuit 34 is variably controlled by the controller 30 controlling a dividing ratio or a pre-scaler value in the PLL circuit 34, thereby variably controlling the carrier frequency of the RF modulated signals from the multiplier 33. That is, the carrier frequency of the RF signals is determined by the program discrete signals, so as to be different from the carrier frequency of the RF signals supplied from the audio signal transmitting unit. When the RF signal input from the external RF input terminal 126 is absent, the controller 30 grounds the external RF input terminal 126 by a termination control signal supplied to the controller 30, thus terminating the RF output terminal 125.

A self-diagnostic function of the audio signal transmitting unit 121 is provided in which output signals from the time-division multiplexer 26 are demultiplexed by the demultiplexer 28 and are transmitted to the controller 30 that is a CPU or the like to judge whether the multiplex is carried out normally or not. The RF signals from the RF signal combiner 37 are demodulated by the bit monitor 29 and fed to the controller 30, so that the controller 30 can judge whether the RF signals are normal or not. The self-diagnosis of the demultiplexer 28 and the bit monitor 29 may be carried out on the basis of presence/absence of errors and the quantity of errors produced by calculating the error correction code, such as the BCH code, added by the multiplexers 25A through 25C.

Diagnosis of the A/D converters 22 may be made by confirming the operation thereof by monitoring the output signals from the A/D converters 22 using the controller 30. As for the signal compressing circuits 23, the diagnosis may be made by switching the mode thereof to a mandatory self-diagnosis mode or test mode, then causing the compression circuit 23 to output 1 kHz sine waves, returning the combined sine waves to an audio signal by the bit monitor 29 and then monitoring the signal using the controller 30.

These self-diagnoses are made by mandatorily switching the mode to the test mode at the time of turning the power on and during a maintenance operation, if necessary. The self-diagnosis utilizing the error correction code added during multiplexing is made periodically at predetermined cycles even in normal operation. In case any failure is generated, the time and status of failure generation are written in, for example, a non-volatile memory 30M, thereby storing the operational history.

The level of the RF output signals supplied from the RF modulator 122 can control the gain of the RF amplifier 36 by using the controller 30. The controller 30 is provided with so-called EIA-485 interface, not shown, through which it can monitor the current status and failure history and can control the output level of the RF signals.

An arrangement of the seat unit 140 for receiving audio signals shown in FIG. 4 and, particularly, an arrangement of the RF distributor 144 and the subsequent elements of the second embodiment are described in detail with reference to FIG. 6, in the RF signal which has been split off by the RF splitter 141 shown in FIG. 4 is fed in at an input terminal 41. This signal is then distributed into three RF signals by the RF distributor 144, so as to be transmitted to input terminals 42A through 42C of RF receivers 145A through 145C, respectively. Since these RF receivers 145A through 145C have the same circuitry, the internal arrangement of only one, for example 145A, is shown, The suffix letter A is omitted from the reference numbers of the respective parts of the RF receiver 145A.

The RF signal fed in at the input terminal 42A of the RF receiver 145A is fed to a tuner 52 of an RF receiving/demodulating circuit 51. The tuner 52 selects the RF signal of one band from among the RF signals that have been frequency-multiplexed at a frequency that differs for each of the audio signal transmitting units 121A through 121D, shown in FIG. 4. The tuner 52 converts the selected RF signal into an IF signal that is fed to a demodulating circuit 53. The demodulating circuit 53 demodulates the IF signal and outputs serial data at the data rate of 6.144 MHz fed to a demultiplexer 54.

The serial data supplied to the demultiplexer 54 are the time-division multiplexed three frames in the voice format or the video format corresponding to television signals from satellite broadcasts or satellite communications, as described above. The demultiplexer 54 releases the time-division multiplex and takes out data corresponding to one frame. The demultiplexer 54 processes the data by error correction decoding, such as BCH decoding, for each frame and then selects and takes out a desired audio channel or data channel. The error correction is for detecting and correcting any bit reversal error that may have been generated by the effects of noise in transmitting or receiving the RF signals. The selection of a desired audio channel or data channel is made in accordance with a command from a micro processor 43.

If the time-division multiplex is released so as to take out a signal for one frame alone, an audio channel or data channel is selected from among the 12 audio channels, or 8 audio channels plus 8 data channels, within one frame. The demultiplexer 54 of the present embodiment is arranged to arbitrarily select two audio channels or an arbitrary data channel from 32 audio channels and 8 data channels corresponding to three frames. Signals corresponding to two arbitrary frames may be taken out upon releasing the time-division multiplex.

The digital data and the clock selected by the demultiplexer 54 are taken out via respective buffer amplifiers, and the audio signals of the two channels, stereo right and left channels, selected by the demultiplexer 54 are transmitted via an expander circuit 55, or connected directly, to a D/A converter 56.

In the expansion by the expander circuit 55, a first expansion mode corresponding to the first compression mode and a second expansion mode corresponding to the second compression mode can be controlled. This mode switching and volume setting are carried out at the command of the micro processor 43.

The D/A converter 56 receives 16-bit audio data expanded by the expander circuit 55, and outputs and transmits two-channel analog audio signals to a headphone amplifier 57. The headphone amplifier 57 is an amplifier for driving the headphone set 147A connected via the passenger controlling unit 146A on the passenger side shown in FIG. 4. The output signals of the headphone amplifier 57 are taken out via left and right output terminals 47$A_L$ and 47$A_R$.

Figure 6:
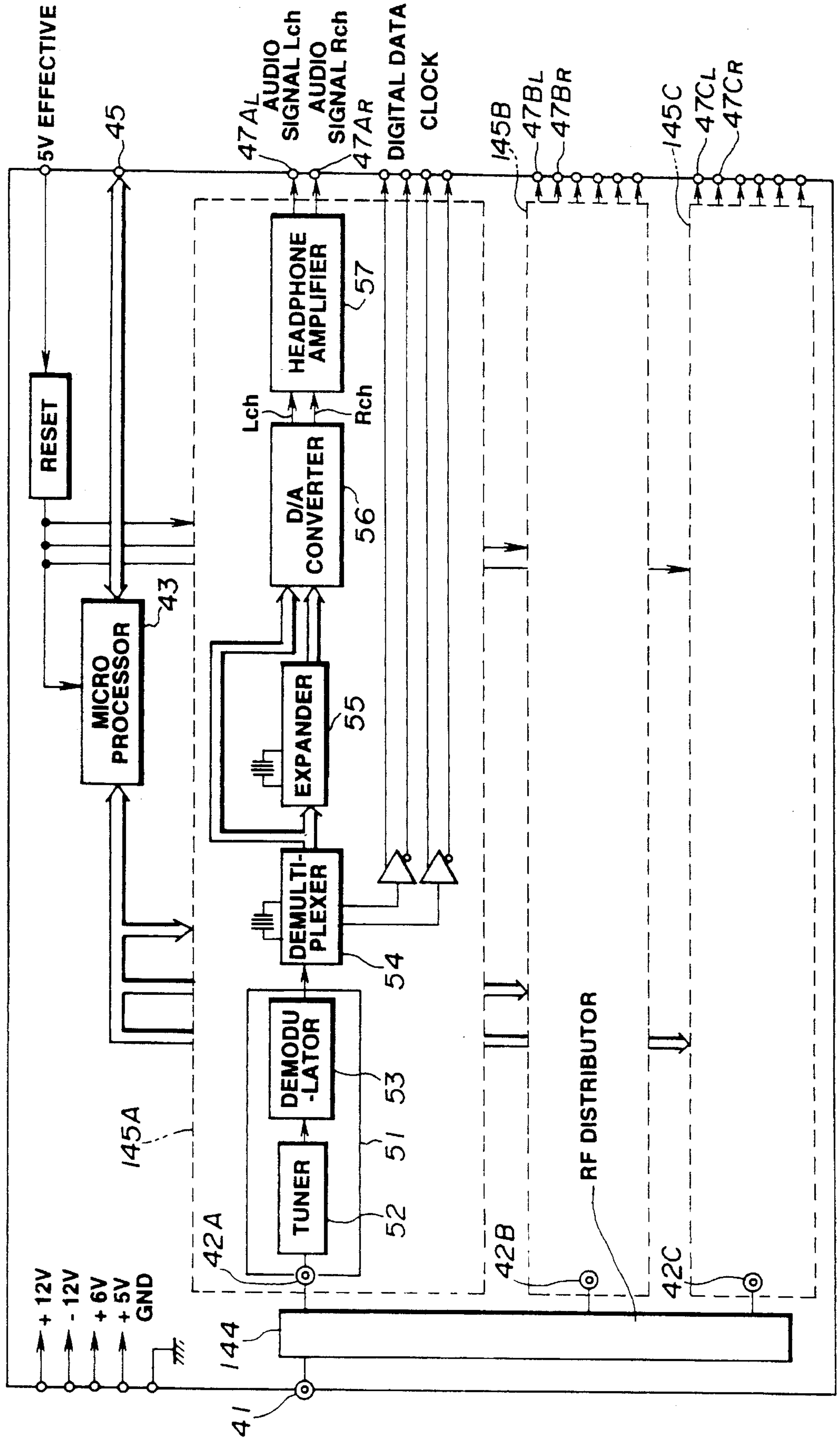
FIG. 6 is a schematic block circuit diagram showing an arrangement of the second embodiment.

In the self-diagnosis of this circuit, the micro processor 43 makes a functional diagnosis of each part, such as a CPU, a RAM, a ROM and a so-called watchdog timer, not shown in FIG. 6. If there is trouble or a failure in the tuning by the tuner 52, demodulation by the demodulator 53, or error correction by the demultiplexer 54, error detection outputs are read by the micro processor 43 and are stored in an internal memory, not shown. This processing can be checked by calculating the error correction codes, such as the BCH codes, added to the transmission signals by the demultiplexer 54, and by reading out the error flags. A control to a muted status or a control for not releasing a currently muted status may be carried out while the results are stored in the memory.

In audio self-diagnosis, the expander circuit 55 outputs test data of a 1 kHz sine wave via the D/A converter 56 to the headphone amplifier 57, the output of which can in turn be transmitted to the micro processor 43. The micro processor 43 detects the 1 kHz sine wave using an A/D converter provided therein and, thus, confirms the normal operation of each circuit. Further, a 0-level signal is output from the expander circuit 55, and the output from a so-called 0-level input terminal, not shown, of the D/A converter 56 can be monitored by the micro processor 43. Thus, whether the D/A converter 56 operates normally or not is confirmed.

The above-described self-diagnosis is made by mandatorily switching the mode to the test mode at the time of turning the power on or during a maintenance operation. The diagnosis by error detection in the demultiplexer 54 may be made periodically at predetermined cycles or, if necessary, during the normal operation. The results of the diagnosis may be taken out via an input/output terminal 45, whereat the micro processor 43 can have data entered or output. The muting operation in accordance with the error detection in the audio signal receiving apparatus of an aircraft of the second embodiment is described with reference to the flowcharts of FIGS. 7 through 9, in which the PA selection mode of the determining cycle T1 is nominated as case A, the channel selection mode of the determining cycle T2 as case B, and the normal operating mode of the determining cycle T3 as case C. The RF receivers 145A through 145C are denoted by respective seat numbers. That is, seat numbers "1", "2", and "3" denote the RF receivers 145A, 145B and 145C, respectively.

Figure 7:
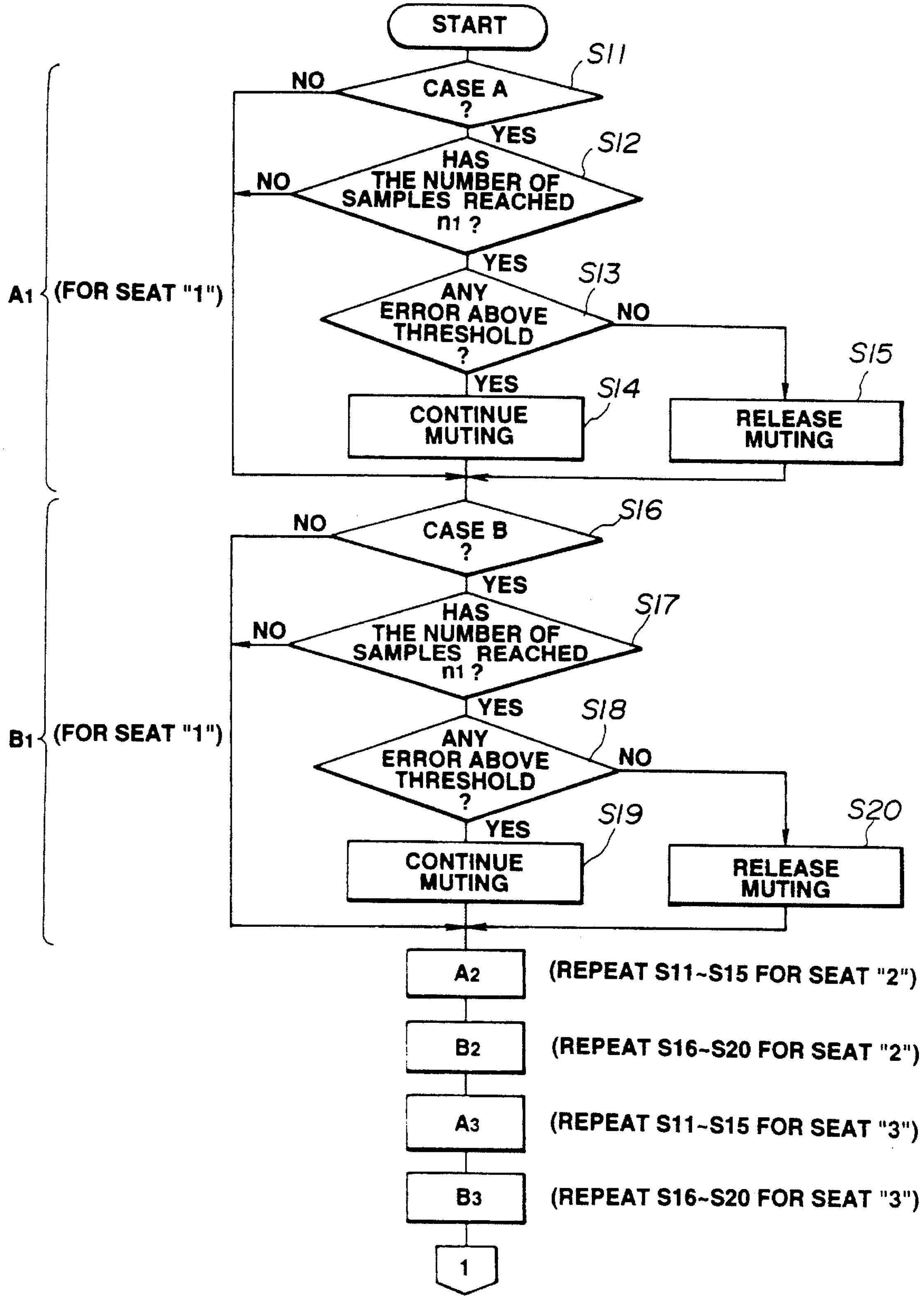
FIG. 7 is a flowchart for illustrating the operation of the second embodiment.

First, at step S11 in the flowchart of FIG. 7, it is judged whether the operating mode of seat "1" corresponding to the RF receiver 145A, case A, which is the PA selection mode. The procedure proceeds to step S12 if the judgment is YES, while it proceeds to step S16 if the judgment is NO.

At step S12 a sampling counter is checked to judge whether the number of samples has reached a predetermined value n1 (=T1/τ). The method proceeds to step S13 if the judgment is YES, while it proceeds to step S16 if the judgment is NO.

At step S13 it is judged whether the number of error flags in the predetermined number of samples at step S12 has reached a value not smaller than a predetermined threshold. The method proceeds to step S14 so as to continue muting if the judgment is YES, while it proceeds to step S15 to release the muting if the judgment is NO.

The above-described steps S11 through S15 form a routine A1 of case A for seat "1."

At step S16 it is judged whether the operating mode of seat "1" is of case B, which is the channel selection mode. The method proceeds to step S17 if the judgment is YES, while it proceeds to a next routine A2 if the judgment NO.

At step S17, the sampling counter is checked to judge whether the number of samples has reached a predetermined value n2 (=T2/τ) or not. The method proceeds to step S18 if the judgment is YES, while it proceeds to the next routine A2 if the judgment is NO.

At step S18 it is judged whether the number of error flags in the predetermined number of samples at step S17 has reached a value not smaller than a predetermined threshold. The method proceeds to step S19 so as to continue muting if the judgment is YES, while it proceeds to step S20 so as to release muting if the judgment is NO.

The above-described steps S16 through S20 form a routine B1 of case B for seat "1."

Similarly, the above steps S11 through S15 are repeated in routine A2 of case A for seat "2" while the above steps S16 through S20 are repeated in routine B2 of case B for seat "2." Also, the above steps S11 through S15 are repeated in routine A3 of case A for seat "3" while the above steps S16 through S20 are repeated in routine B2 of case B for seat "2."

Figure 8:
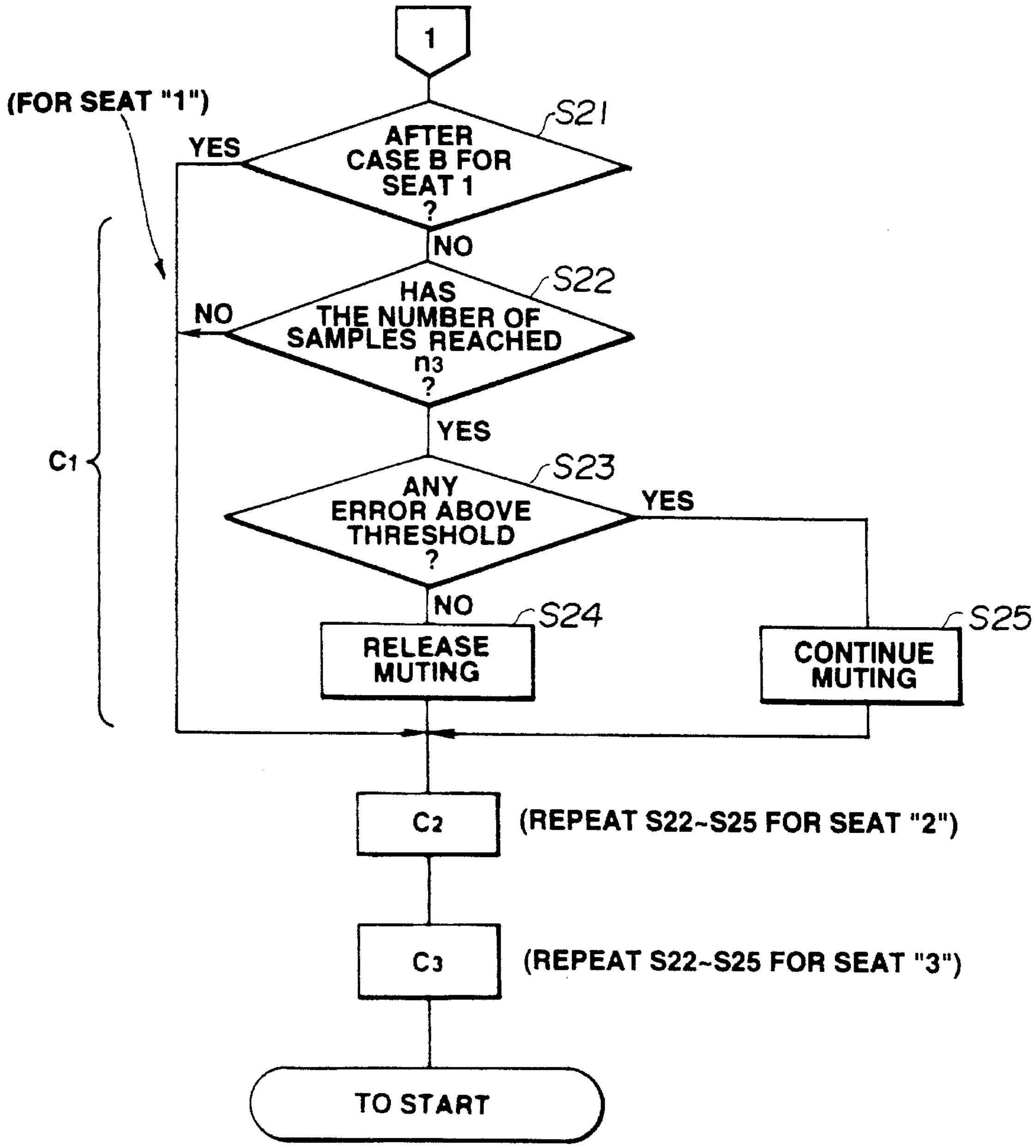
FIG. 8 is a flowchart for illustrating the operation of the second embodiment.

The above-described is the flow of muting operation of cases A and B. The flow of muting operation for case C is shown in FIG. 8, in which at step S21, it is judged whether tuner switching has finished case B for seat "1," that is, is routine B1 completed. A routine for seat "1" in the normal operation mode, that is, routine C1 of case C for seat "1" starts at step S22 if the judgment is NO, while the process proceeds to a next routine C2 if the judgment is YES.

At step S22, the sampling counter is checked to judge whether the number of samples has reached a predetermined value n3 (=T3/τ). The method proceeds to step S23 if the judgment is YES, while it proceeds to the next routine C2 if the judgment is NO.

At step S23 it is judged whether the number of error flags in the predetermined number of samples at step S22 has reached a value not smaller than a predetermined threshold. The method proceeds to step S25 so as to continue muting if the judgment is YES, while it proceeds to step S24 so as to release muting if the judgment is NO.

The above-described steps S22 through S25 form routine C1 of case C for seat "1".

Similarly, the above steps S22 through S24 are repeated in routine C2 of case C for seat "2" while the above steps S22 through S25 are repeated once again in routine C3 of case C for seat "3". The process of muting returns to the start, and the above-described routines are repeated.

Figure 9:
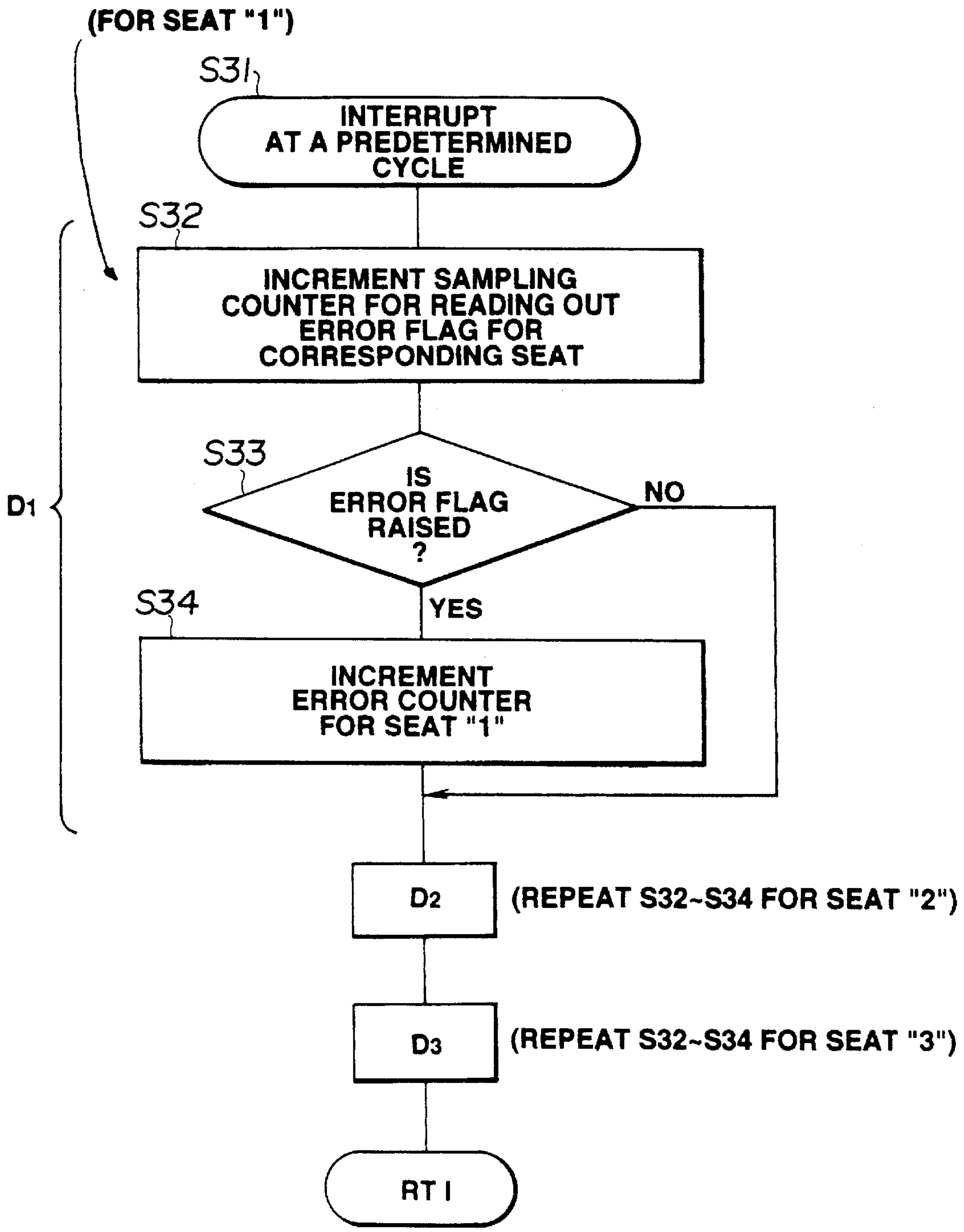
FIG. 9 is a flowchart for illustrating the operation of the second embodiment.

A method of interrupting operation for sampling error flags is shown in the flowchart FIG. 9, in which at step S31 an error flag read-out operation is started. The read-out is carried out in accordance with clocks generated at a predetermined cycle τ as shown in FIG. 1*b*. At step S32, the sampling counter of the corresponding RF receiving apparatus is incremented, in order to judge whether error flags of the corresponding seat, for example, the RF receiving apparatus of seat "1" are raised at a next step S33 This is because the error flags are read out by the clocks, as described above.

At step S33 it is judged whether the error flag is raised for each of the clocks which are incremented in step S32. The method proceeds to step S34 so as to increment the error flag counter of seat "1" if the judgement is YES, while the procedure escapes from the routine for seat "1" so as to repeat the same routine, consisting of steps S32 through S34 for seat "2" if the judgment is NO.

The routine of steps S32 through S34 for seat "1" is nominated as a routine D1, the routine of steps S32 through S34 for seat "2" as routine D2, and the routine of steps S32 through S34 for seat "3" as routine D3.

The timings of muting and mute release in the PA selection mode and the channel selection of the aircraft audio signal receiving apparatus of the second embodiment are described with reference to the timing charts of FIGS. 10(*a*) through 10(*i*) and 11(*a*) through 11(*j*).

Figures 10A, 10B, 10C, 10D, 10E, 10F, 10G, 10H, 10I:
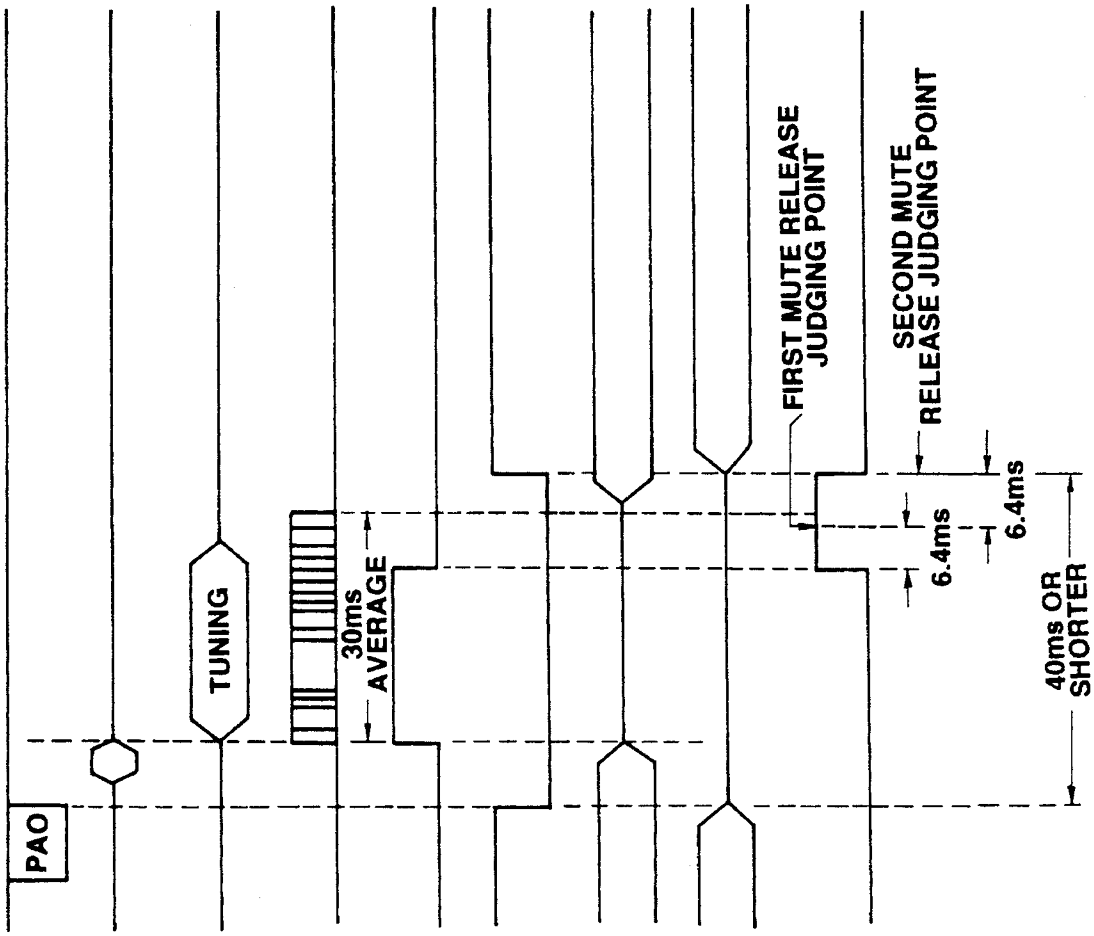
FIGS. 10(*a*)–10(*i*) are timing charts for illustrating the operation of the second embodiment in the PA selection mode.

FIG. 10(*a*) shows the timing for a command (PAC) outputted from a serial peripheral interface (SPI) to the micro processor 43. The command PAO is a command for switching all channels to the PA channel.

FIG. 10(*b*) shows a timing for preset data of a tuner outputted by the micro processor 43.

FIG. 10(*c*) shows a timing for tuning to a predetermined PA channel in the tuning operation by the tuner in the PA selection mode.

FIG. 10(*d*) shows error flags that are outputted by the demultiplexer 54 and are read by the micro processor 43.

FIG. 10(*e*) shows whether a synchronization pulse is outputted by the demultiplexer 54 and read by the micro processor 43 or not, wherein the high level shows that the micro processor does not receive the synchronization pulse.

FIG. 10(*f*) shows a timing for muting.

FIG. 10(*g*) shows a timing for a digital audio data output of the expander circuit 55.

FIG. 10(*h*) shows a timing for an analog audio data output.

FIG. 10(*i*) shows a timing for error flag counting operation.

Figures 11A, 11B, 11C, 11D, 11E, 11F, 11G, 11H, 11I, 11J:
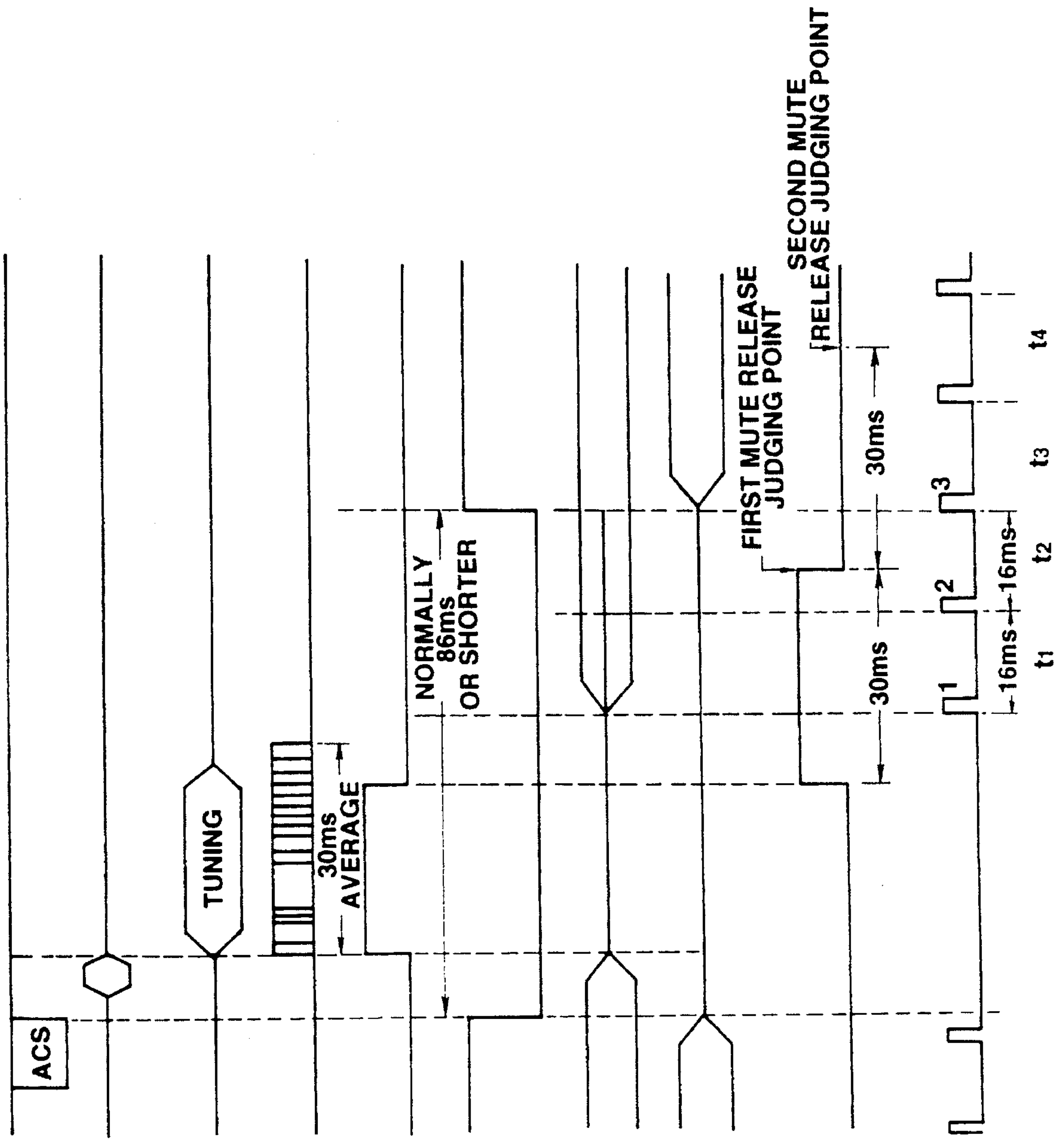
FIGS. 11(*a*)–11(*j*) are a timing charts for illustrating the operation of the second embodiment in the channel selection mode.

FIG. 11(*a*) shows a timing for a command (ACS) output from the serial peripheral interface (SPI) to the micro processor 43. The command ACS (Audio Channel Selection) is to indicate the channel selection mode.

The timings shown in FIGS. 11(*b*) through 11(*i*) are the same as the respective timings shown in FIGS. 10(*b*) through 10(*i*).

FIG. 11(*j*) shows a timing for a super frame outputted by the demultiplexer 54.

The synchronization pulses shown in FIGS. 10(*e*) and 11(*e*) are output by the demultiplexer 54, as described above, and are to indicate whether data packets are synchronized prior to judging the quantity of error flags.

The error flag sampling operation is not conducted in the PA selection mode and is not conducted in the channel selection mode, unless the synchronization pulse is not at a low (L) level. However, when the NSYNC is not at the low (L) level, the error flags remain raised, thus maintaining the muted status. Therefore, a judgment based simply on the error flags is possible.

In the channel selection operation, if the error flag shown in FIG. 11(*d*) greatly exceeds 30 msec, the error flag counting is continued up to the second counting period as shown in FIG. 11(*i*), thus elongating the muting period to 86 msec as shown in FIG. 11(*f*).

If the judgment on muting is made simply based on the error flags, the muting is released as shown in FIG. 11(*i*). Nevertheless, even if correct data are entered when the errors are eliminated, the next voice frame is extended so as to output the next following voice frame. Therefore, the micro processor 43 continues muting until three voice frames are counted from the elimination of the synchronization pulse. In case of FIG. 11(*i*), the judgment on mute release by counting the error flags is delayed.

In the PA selection mode, the sound frame as shown in FIG. 11(*j*) exists regardless of mute release. The input and extension thereof take only about 2 msec, which is sufficiently quick. In this mode, the mute is released only at a rate shown in FIG. 10(*d*). As a matter of course, the mute may be released simply at the first judgment of mute release.

In the second embodiment, by variably controlling the determining cycle for the error flags in each of the RF receivers of the aircraft audio signal receiving apparatus, it is possible to carry out appropriate muting or mute release in accordance with the operating mode, thereby outputting correct voice data in an optimum time.

In the signal receiving apparatus according to the present invention for receiving input signals including the error detection code and having a function of muting output signals in accordance with the error detection information produced from the error detection code, whether to mute or release muting of the output signals in accordance with the error detection information produced from the error detection code is determined at predetermined cycles, and the determining cycle is variably controlled in accordance with the three operating modes, that is, the normal operating mode, the mode for switching the frequency band of the frequency-multiplexed input signal, and the mode in which the input status is externally and mandatorily controlled. Therefore, it is possible to carry out appropriate muting or mute release in accordance with the operating mode, thus outputting correct data in an optimum time.

It is to be noted that the present invention is not limited to the first and second embodiments, and may be applied to an audio signal receiving apparatus provided for a passenger seat of a train or a bus.

What is claimed is:

1. A signal receiving apparatus having a plurality of operating modes for receiving a digital input signal including an error detection code and for muting an output signal in response to a number of error flags detected by the error detection code, the apparatus comprising:

means for selecting an operating mode from the plurality of operating modes;

signal receiving means for receiving the digital input signal including the error detection code and producing a demodulated output signal;

means for decoding the demodulated output signal and producing a decoded demodulated output signal including error flags detected by the error detection code;

output means for converting the decoded demodulated output signal from the means for decoding into an analog output signal; and processor means for receiving the error flags from the means for decoding and controlling the output means to mute or release muting of the analog output signal, wherein the processor means includes means for counting the error flags to determine the number of error flags detected by the error detection code and sets a determining period according to the operating mode selected from the plurality of the operating modes by the means for selecting such that when the number of error flags exceeds a threshold number for the determining period of the operating mode the processor means mutes the analog output signal, and when an operating mode having a shorter determining period than an immediately previous operating mode is selected the processor means releases muting.

2. The signal receiving apparatus according to claim 1, wherein said means for decoding comprises a demultiplexer.

3. The signal receiving apparatus according to claim 1, wherein said output means comprises a digital-to-analog converter.

4. The signal receiving apparatus according to claim 1, wherein the signal receiving means comprises a tuner for selecting one channel signal from a plurality of channel signals multiplexed in the digital input signal and in which a first operating mode of the plurality of operating modes is a normal receiving mode and a second operating mode of the plurality of operating modes is a channel selecting mode.

5. The signal receiving apparatus according to claim 4, wherein said processor means sets said determining period to be longer in said normal receiving mode than in said channel selecting mode.

6. The signal receiving apparatus according to claim 4, further comprising a public address controlling device for producing an announcement signal fed to the means for decoding, and wherein a third operating mode from the plurality of operating modes is a public announcement mode.

7. The signal receiving apparatus according to claim 6, wherein said processor means sets said determining period to be longer in said normal receiving mode than in said channel selecting mode and longer in said channel selecting mode than in said public announcement mode.

8. A signal receiving apparatus for use in an aircraft, comprising:

receiver means for receiving an input signal including an error detection code, the input signal formed of a plurality of channels multiplexed together and operable in a plurality of operating modes;

a first selecting means for selecting an operating mode from the plurality of operating modes;

a second selecting means for selecting a channel from the plurality of multiplexed channels;

decoding means for decoding the selected channel and for detecting errors using the error detection code included in the input signal;

output means for outputting a decoded signal from the decoding means; and means for controlling the output means to mute or release muting of the decoded signal in response to an error detection result from the decoding means using the error detection code, wherein the means for controlling controls the muting or release of muting within a determining period set in accordance with the operating mode selected from the plurality of operating modes by the second selecting means.

9. The signal receiving apparatus according to claim 8, wherein the means for controlling sets the determining period to a first time length when the second selecting means has selected a normal operation mode from the plurality of operating modes, to a second time length when the second selecting means has selected a channel selecting mode from the plurality of operating modes, and to a third time length when the second selecting means has selected an announcement mode from the plurality of operating modes, where the first time length is longer than the second time length and the second time length is longer than the third time length.

10. The signal receiving apparatus according to claim 9, wherein said decoding means comprises a demultiplexer.

11. The signal receiving apparatus according to claim 10, wherein said output means comprises a digital-to-analog converter.

12. A method of receiving a signal in an apparatus that operates in a plurality of operating modes, in which an input signal is formed of a plurality of signals multiplexed together and includes an error detection code, the method comprising the steps of:

selecting an operating mode from the plurality of operating modes;

setting a determining period for the selected operating mode;

receiving and demodulating the input signal including the error detection code;

decoding the demodulated input signal including the error detection code to produce a decoded signal and error flags;

converting the decoded signal into an analog output signal;

counting the error flags occurring within the determining period of the selected operating mode to determine a number of error flags;

determining whether the number of error flags exceeds a threshold for the determining period of the selected operating mode;

muting the analog output signal when the number of error flags is determined to exceed the threshold for the determining period of the selected operating mode;

releasing muting of the analog output signal when the determining period of the selected operating mode is shorter than a determining period of an immediately previous operating mode; and controlling a length of the determining period according to the operating mode selected from the plurality of operating modes.

13. The method of claim 12, wherein the step of decoding includes the step of demultiplexing the demodulated input signal.

14. The method of claim 12, wherein the step of receiving includes selecting a channel from a plurality of channels multiplexed in the input signal, and wherein a first operating mode from the plurality of operating modes is a normal receiving mode and a second operating mode from the plurality of operating modes is a channel selecting mode.

15. The method of claim 14, wherein the step of controlling a length includes setting the determining period to be longer in the first operating mode than in the second operating mode.

16. The method of claim 14, further comprising providing a public address announcement signal to be decoded, and wherein a third operating mode from the plurality of operating modes is a public announcement mode.

17. The method of claim 16, wherein the step of controlling a length includes setting the determining period to be longer in the first operating mode than in the second operating mode and setting the determining period to be longer in the second operating mode than in the third operating mode.

18. A method of receiving signals including error detection codes for use inside an aircraft, the method comprising the steps of:

receiving an input signal including an error detection code, the input signal formed of a plurality of channels multiplexed together;

selecting a channel from the plurality of multiplexed channels;

selecting an operating mode from a plurality of operating modes;

decoding the selected channel and detecting errors using the error detection code included in the input signal;

counting the errors occurring within a determining period of the selected operating mode to determine a number of errors;

determining whether the number of errors exceeds a threshold for the determining period of the selected operating mode;

converting the decoded channel into an analog output signal;

muting the analog output signal when the number of errors exceeeds the threshold; and controlling the determining period according to the operating mode selectred from the plurality of operating modes.

19. The method of claim 18, wherein a first operating mode from the plurality of operating modes is a normal receiving mode, a second operating mode from the plurality of operating modes is a channel selecting mode, and a third operating mode from the plurality of operating modes is an announcement mode, and wherein the step of controlling the determining period includes setting the determining period to be longer in the first operating mode than in the second operating mode and setting the period to be longer in the second operating mode than in the third operating mode.

* * * * *